US006728800B1

(12) United States Patent
Lee et al.

(10) Patent No.: US 6,728,800 B1
(45) Date of Patent: Apr. 27, 2004

(54) EFFICIENT PERFORMANCE BASED SCHEDULING MECHANISM FOR HANDLING MULTIPLE TLB OPERATIONS

(75) Inventors: Allisa Chiao-Er Lee, Sunnyvale, CA (US); Greg S. Mathews, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 453 days.

(21) Appl. No.: 09/606,844

(22) Filed: Jun. 28, 2000

(51) Int. Cl.[7] .............................................. G06F 13/14
(52) U.S. Cl. ............................. 710/54; 710/44; 710/52; 711/113; 711/133
(58) Field of Search ............................ 710/44, 54, 52; 711/133, 113

(56) References Cited

U.S. PATENT DOCUMENTS

| | | | | |
|---|---|---|---|---|
| 4,695,950 A | * | 9/1987 | Brandt et al. ............... | 364/200 |
| 4,733,348 A | * | 3/1988 | Hiraoka et al. ............. | 364/200 |
| 4,980,816 A | * | 12/1990 | Fukuzawa et al. .......... | 364/200 |
| 6,012,134 A | * | 1/2000 | McInerney et al. ......... | 711/207 |
| 6,263,403 B1 | * | 7/2001 | Traynor ....................... | 711/133 |
| 6,538,650 B1 | * | 3/2003 | Prasoonkumar et al. .... | 305/419 |
| 6,560,664 B1 | * | 5/2003 | Calson ........................ | 710/113 |

* cited by examiner

*Primary Examiner*—Abdelmoniem Elamin
(74) *Attorney, Agent, or Firm*—Blakely, Sokoloff, Taylor & Zafman LLP

(57) ABSTRACT

A method and apparatus for an efficient performance based scheduling mechanism for handling multiple TLB operations. One method of the present invention comprises prioritizing a first translation lookaside buffer request and a second translation lookaside buffer request for handling. The first request is of a first type and the second request is of a second type. The first type having a higher priority than said second type.

35 Claims, 5 Drawing Sheets

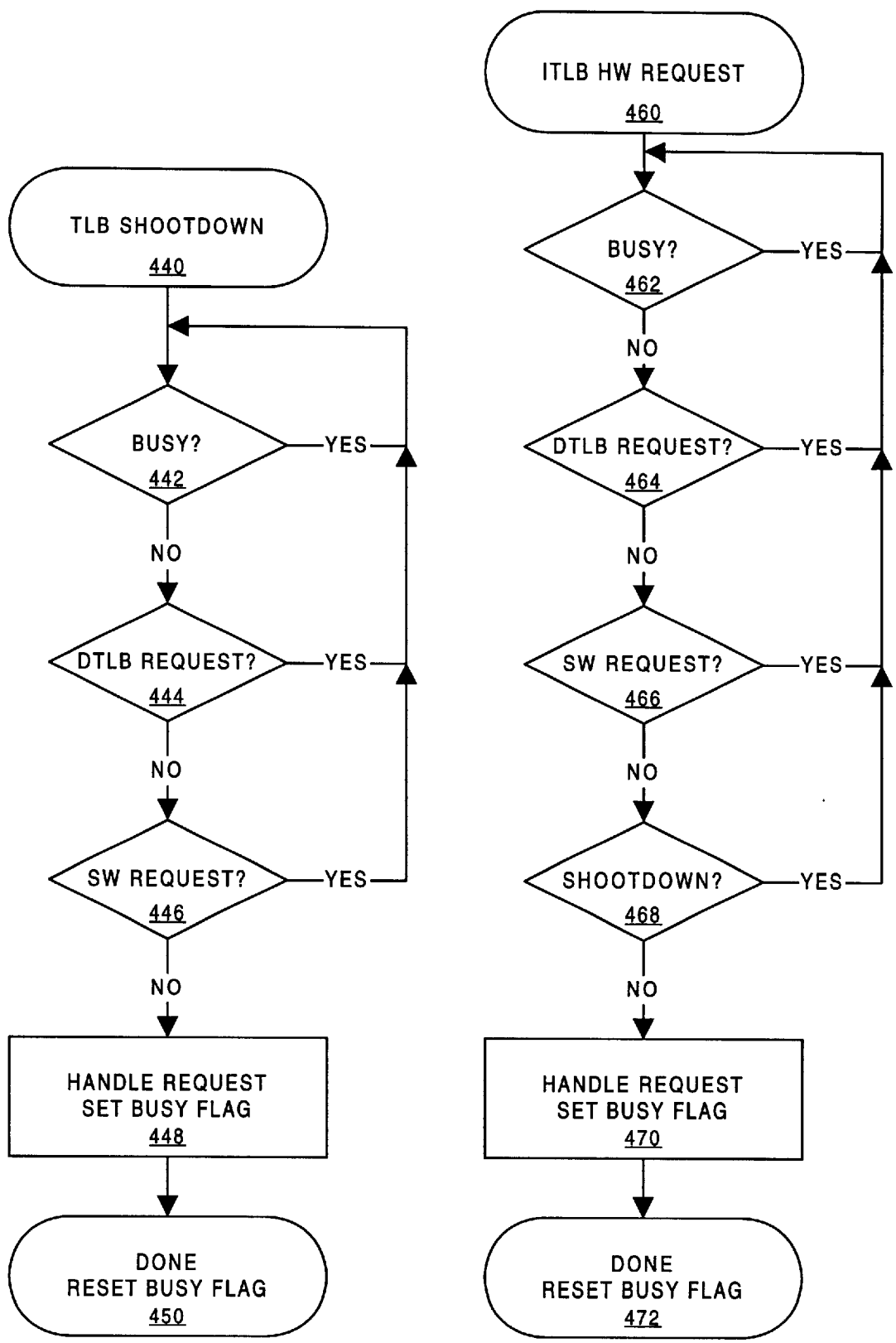

EFFICIENT PERFORMANCE BASED SCHEDULING MECHANISM FOR HANDLING MULTIPLE TLB OPERATIONS

FIELD OF THE INVENTION

The present invention relates generally to the field of computers and computer systems. More particularly, the present invention relates to an efficient performance based mechanism for handling multiple TLB operations.

BACKGROUND OF THE INVENTION

Since the beginning of electronic computing, software applications have been placing greater and greater demands on memory requirements. Computer systems have also evolved to include memory hierarchies comprising various types of long term storage, main memory, and caches. However, as one moves down the down the memory hierarchy from caches to long term storage, device access times increase dramatically. An ideal solution is to have enough cache memory or fast main memory available to service the currently executing program. Furthermore, at any instant in time, most computers are running multiple processes, each with its own address space. But in most systems, physical memory is present in only limited amounts or programs demand more memory than is available.

One means of sharing a limited amount of physical memory among many processes is by utilizing virtual memory, dividing the physical memory into blocks and allocating the blocks dynamically to different processes. The use of virtual memory also allows a programmer to design programs which access more memory than is physically present in a system. Generally, a program is given its own address space. This address space is also divided into blocks called pages. During program execution, pages that are needed for current program execution are stored in main memory, whereas pages that are not currently being accessed are stored in slower secondary storage such as a hard disk drive. As a program is executed, pages are swapped in and out between main memory and the hard disk drive as specific code is required for program execution.

By using virtual memory, programs are using virtual addresses to access their code. The processor takes the virtual addresses and translates them to physical addresses which are used to access main memory. This process is called memory mapping or address translation. Current computer systems are capable of handling a very large virtual memory spaces. Depending on the page size of the system, the number of pages that need to be addressed can also be very large. Hence, virtual address to physical address translations can be complicated and time consuming.

In many systems, a data structure, referred to as a page table, is employed to maintain the mappings between virtual and physical addresses. When in use, a virtual page number (the number represents the position of a virtual page within virtual memory space) is used to reference an entry in the page table which contains the physical address translation for the virtual page which corresponds to the virtual page number. These tables can be very large.

Therefore, to save physical memory space, the page tables themselves are often only partially stored in main memory while the bulk of the table entries are stored on a hard disk and swapped in and out of memory on an as-needed basis. To reduce translation time, computers often use a translation look-aside buffer (TLB) to cache frequently used virtual to physical address translations.

Existing processors maintain TLB entries through either a software scheme or through a hardware scheme or a combination of the two. The tradeoff being in speed versus flexibility. As consumers demand faster and better system performance, the ability to quickly manage large memory spaces becomes increasingly important.

BRIEF DESCRIPTION OF THE DRAWINGS

The present invention is illustrated by way of example and not limitations in the figures of the accompanying drawings, in which like references indicate similar elements, and in which:

FIG. 4C illustrates the handling of TLB shootdown requests in one embodiment; and FIG. 4D illustrates the handling of instruction TLB hardware requests in embodiment.

DETAILED DESCRIPTION

Figure 1:
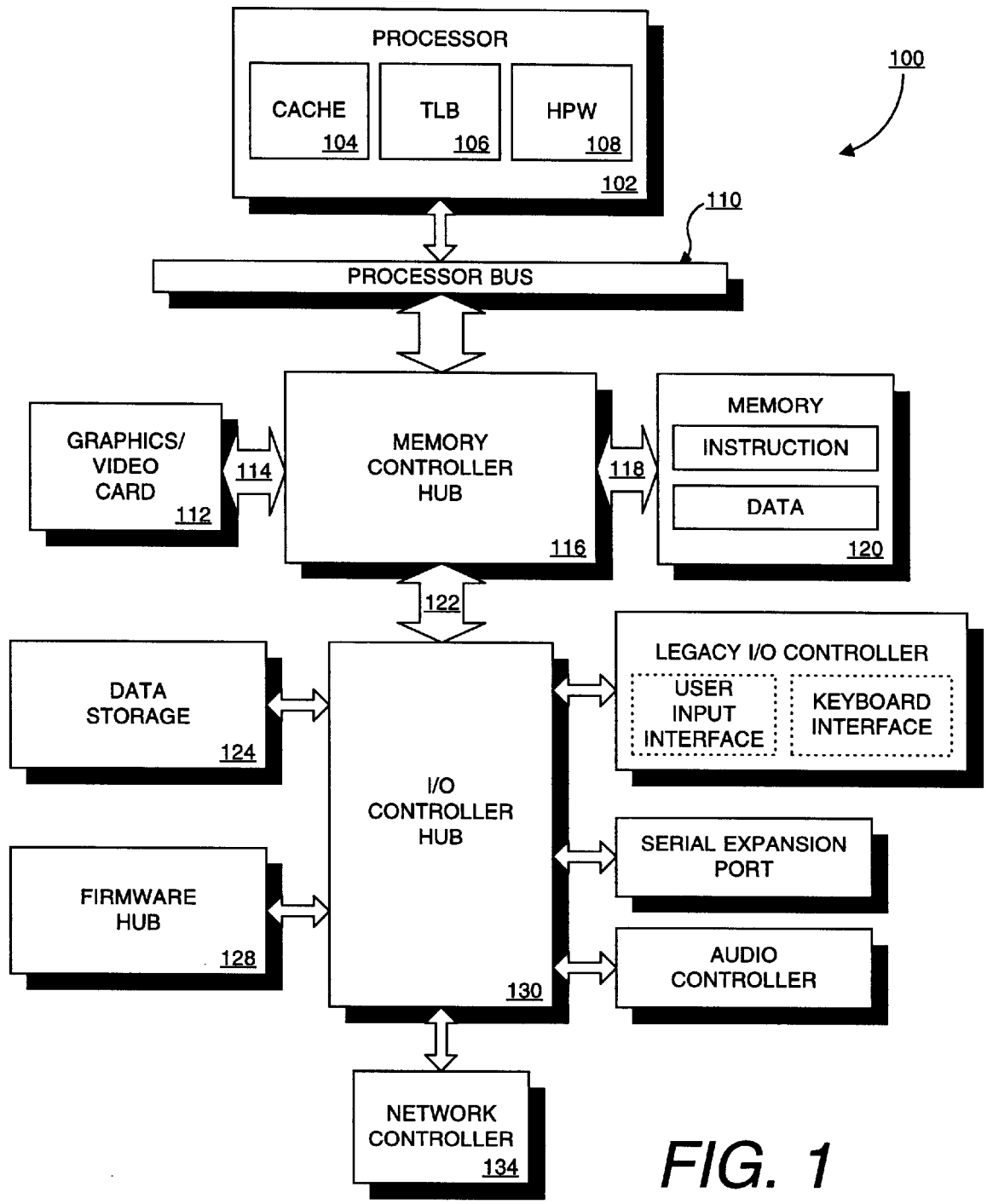
FIG. 1 is a block diagram of one embodiment of a system employing an efficient performance based scheduling mechanism for handling multiple TLB operations.

A method and apparatus for an efficient performance based scheduling mechanism for handling multiple TLB operations is disclosed. The embodiments described herein are described in the context of a microprocessor, but are not so limited. Although the following embodiments are described with reference to processors, other embodiments are applicable to other integrated circuits or logic devices. The same techniques and teachings of the present invention can easily be applied to other types of circuits or semiconductor devices that use a TLB or memory.

In the following description, for purposes of explanation, numerous specific details are set forth in order to provide a thorough understanding of the present invention. One of ordinary skill in the art, however, will appreciate that these specific details are not necessary in order to practice the present invention. In other instances, well known electrical structures and circuits have not been set forth in particular detail in order to not necessarily obscure the present invention.

Embodiments of the present invention relate to the efficient implementation of a logical unit for handling multiple TLB operations in high performance microprocessors. Many of today's computer systems also have multiple processors. TLB operations are no longer limited to originating from within the processor. Processors have to be able to handle TLB operations initiated by other processors in the system.

As the performance of computer systems increase, so does the complexity of the processors. To maximize the sharing and management of main memory, modern high performance processors support virtual memory. The use of virtual memory allows a computer system to have less physical memory than can be virtually addressed and allows dynamic control/mapping of the physical memory resource. In a typical implementation, the operating system will keep a mapping or page table between the virtual memory space and the physical memory. This table is examined by the processor on every virtual memory access. In order to enhance speed, modern processors implement a caching structure, called a translation look-aside buffer (TLB) inside the processor. This TLB structure is kept coherent with the page table in the main memory by the operating system, often with hardware assist such as a hardware page walker.

Among the different areas that designers attempt to modify to improve performance from a processor is the TLB. In general, TLB coherency and contents are maintained primarily through software (as in MIPS processors of MIPS Technologies, Inc. of Mountain View, Calif.) or through hardware (as in the x86 processors although x86 processors use software to flush their TLBs). The trade-off between the schemes is in speed versus complexity.

Embodiments of the present invention combine the best of both worlds by providing a hardware mechanism (i.e., a hardware page walker or HPW) and instructions to allow the operating system to manage the TLB structures. All TLB related transactions are serialized at a central location and their priorities arbitrated. In addition, one new processor architecture also implements an instruction that allows a processor to invalidate entries in another processor's TLB. The end result is that at any one time, a processor could be operating on its own TLB structures in parallel to its HPW. Simultaneously, another processor could be trying to invalidate entries in that TLB. This type of parallel execution can be error prone and have many corner cases that must be handled properly. A simple and efficient method for dealing with this type of parallel operation is disclosed below. One method of this invention provides a processor with a robust way to handle multiple TLB operations. Embodiments of this scheme can use less hardware, have less complexity and fewer tricky corner cases.

Referring now to FIG. 1, a computer system 100 is shown. System 100 includes a component, such as a processor, employing a scheduling mechanism for handling multiple TLB operations in accordance with the present invention, such as in the embodiment described herein. System 100 is representative of processing systems based on the PENTIUM® Pro, PENTIUM® II, PENTIUM® III, Itanium® microprocessors available from Intel Corporation of Santa Clara, Calif., although other systems (including PCs having other microprocessors, engineering workstations, set-top boxes and the like) may also be used. In one embodiment, sample system 100 may be executing a version of the WINDOWS™ operating system available from Microsoft Corporation of Redmond, Wash., although other operating systems and graphical user interfaces, for example, may also be used. Thus, the present invention is not limited to any specific combination of hardware circuitry and software.

FIG. 1 is a block diagram of one embodiment of a system 100. System 100 is an example of a hub architecture. The computer system 100 includes a processor 102 that processes data signals. The processor 102 may be a complex instruction set computer (CISC) microprocessor, a reduced instruction set computing (RISC) microprocessor, a very long instruction word (VLIW) microprocessor, a processor implementing a combination of instruction sets, or other processor device, such as a digital signal processor, for example. FIG. 1 shows an example of an embodiment of the present invention implemented in a single processor system 100. However, it is understood that other embodiments may alternatively be implemented as systems having multiple processors. Processor 102 is coupled to a processor bus 110 that transmits data signals between processor 102 and other components in the system 100. The elements of system 100 perform their conventional functions well known in the art.

System 100 includes a memory 120. Memory 120 may be a dynamic random access memory (DRAM) device, a static random access memory (SRAM) device, flash memory device, or other memory device. Memory 120 may store instructions and/or data represented by data signals that may be executed by processor 102. A cache memory 104 can reside inside processor 102 that stores data signals stored in memory 120. Alternatively, in another embodiment, the cache memory may reside external to the processor.

A TLB 106 and a hardware page walker (HPW) 108 also reside in processor 102. Alternate embodiments of a TLB 106 and a HPW 108 can also be used in microcontrollers, embedded processors, graphics devices, DSPs, and other types of logic circuits.

A system logic chip 116 is coupled to the processor bus 110 and memory 120. The system logic chip 116 in the illustrated embodiment is a memory controller hub (MCH). The processor 102 communicates to the MCH 116 via a processor bus 110. The MCH 116 provides a high bandwidth memory path 118 to memory 120 for instruction and data storage and for storage of graphics commands, data and textures. The MCH 116 directs data signals between processor 102, memory 120, and other components in the system 100 and bridges the data signals between processor bus 110, memory 120, and system I/O 122. In some embodiments, the system logic chip 116 provides a graphics port for coupling to a graphics controller 112. The MCH 116 is coupled to memory 120 through a memory interface 118. The graphics card 112 is coupled to the MCH 116 through an Accelerated Graphics Port (AGP) interconnect 114.

System 100 uses a proprietary hub interface bus 122 to couple the MCH 116 to the I/O controller hub (ICH) 130. The ICH 130 provides direct connections to some I/O devices. Some examples are the audio controller, firmware hub (BIOS) 128, data storage 124, legacy I/O controller containing user input and keyboard interfaces, a serial expansion port such as Universal Serial Bus (USB), and a network controller 134. The data storage device 124 can comprise a hard disk drive, a floppy disk drive, a CD-ROM device, a flash memory device, or other mass storage device.

The present enhancement is not limited to computer systems. Alternative embodiments of the present invention can be used in other devices such as, for example, handheld devices and embedded applications. Some examples of handheld devices include cellular phones, Internet Protocol devices, digital cameras, personal digital assistants (PDAs), and handheld PCs. Embedded applications can include a microcontroller, a digital signal processor (DSP), system on a chip, network computers (NetPC), set-top boxes, network hubs, wide area network (WAN) switches, or any other system which uses a TLB for address translations.

Figure 2:
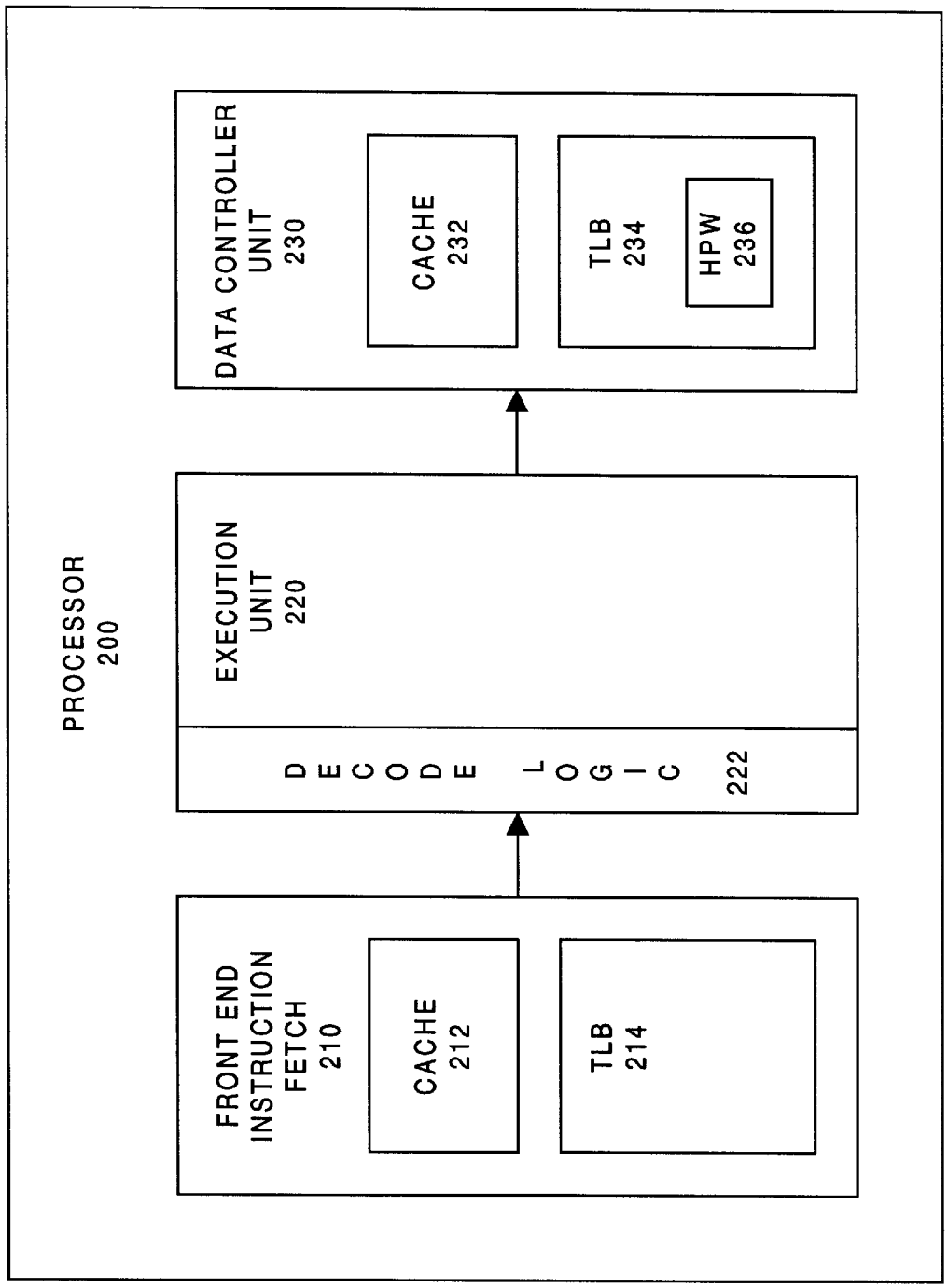
FIG. 2 is a block diagram of one embodiment of a processor including a TLB and a hardware page walker mechanism.

FIG. 2 is a block diagram of one embodiment of a processor 200 including a TLB 234 and a HPW mechanism 236. The processor 200 receives data and code during instruction fetch through the front end 210. The fetched data and code can be stored in the front end first level instruction cache 212 prior to execution.

The cache can be bifurcated into a code cache 212 and a data cache 232. The first level code cache 212 services requests for instructions generated by the instruction prefetcher while the first level data cache 232 services memory data read and write requests generated by the processor's execution units 220 when they are executing any instruction that requires a memory data access.

A code TLB 214 can be incorporated in the front end of the code cache 212, translating the virtual code address produced by the prefetcher into a physical memory address before the lookup is performed. A data TLB 234 can be incorporated in the front end of the data cache 232, translating the virtual address produced by the load and store units into a physical memory address before the lookup is performed.

The front end instruction TLB (ITLB) 214 can maintain entries for currently accessed pages. The fetched instructions are sent to decode logic 222 for decoding and execution in the execution unit 220. After instruction decode, the execution unit 220 sends the instructions to the data controller unit (DCU) 230. The DCU 230 of this embodiment includes a first level data cache 232 and a data TLB (DTLB) 234. The DTLB 234 further comprises a HPW 236 to handle TLB access requests that modify some aspect of a TLB entry such as a tag, data, or attribute. TLB accesses such as TLB entry reads that do not modify entries do not have to be handled by the HPW 236.

Figure 3:
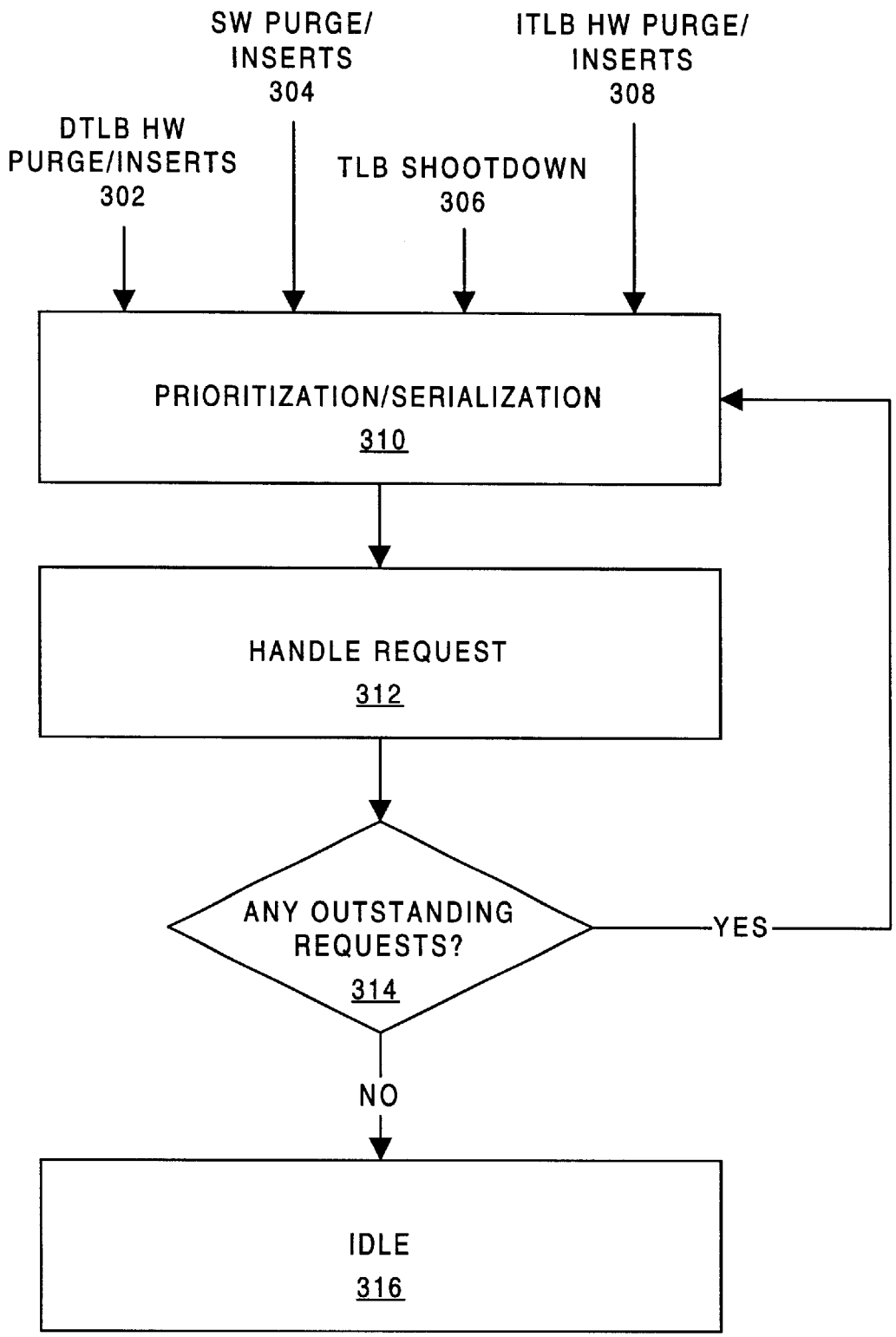
FIG. 3 is a flow diagram illustrating how requests are handled in one embodiment of the invention.

FIG. 3 is a flow diagram illustrating how requests are handled in one embodiment of the invention. For this embodiment, four different types of translation lookaside buffer modification requests are handled: (1) data TLB hardware (DTLB HW) purge/inserts 302; (2) software (SW) purge/inserts 304; (3) TLB shootdowns 306; and (4) instruction TLB hardware (ITLB HW) purge/inserts 308. As the modification requests 302, 304, 306, 308 are received at the TLB, the requests are directed to a HPW. However, not all four types of TLB modification requests 302, 304, 306, 308 are necessarily present during every clock cycle.

Even though multiple TLB requests may be submitted to the HPW simultaneously, the HPW will only handle one request at a time. To enhance performance, the requests are scheduled based on their priority. The scheduling takes into account the urgency of the requests in terms of performance impact. Another factor taken into account during scheduling is correct functionality. For each request, the HPW of this embodiment schedules or prioritizes the incoming requests in the following order: DTLB HW purge/inserts 302, SW purge/insert instructions 304, TLB shootdowns 306, ITLB HW purge/inserts 308. DTLB HW purge/inserts 302, which are generated as a result of data/stack access translations, are the most performance critical and come before software purge/insert instructions and ITLB HW purge/inserts in program order and thus, are scheduled to be handled first. SW purge/inserts 304, which come before ITLB HW purge/inserts in program order come second. TLB shootdowns 306, which come from another processor are third. TLB shootdowns are purge requests initiated by another processor with the same TLB domain. ITLB HW purge/inserts 308, which are generated as a result of instruction translations in the instruction prefetch unit are last. ITLB HW purge/inserts 308 receive the least priority because such requests must have been speculative. If the request was non-speculative, then the pipeline would have been empty as the processor would have been idle waiting for the non-speculative instruction to be retrieved.

The HPW takes the requests submitted for execution during a particular clock cycle, and prioritizes the requests based on handling priorities in step 310. One reason for serialization of the requests is that this implementation provides for the handling of only one such TLB modification request at a time. After the requests 302, 304, 306, 308 are prioritized/serialized, each request is handled in turn at step 312. As each request is handled, the TLB can be locked out from other modification accesses with a mechanism such as a busy flag or hardware protection. At step 314, the HPW checks whether any outstanding requests are present. If there are any requests outstanding, the HPW loops back to step 310 to prioritize/serialize these outstanding requests. If there are no more TLB modification requests present, the HPW moves to an idle state at step 316.

The scheduling is done every time the HPW is ready to handle another request. A higher priority request may preempt older requests that have less priority. The scheduling requests are then handled one at a time. This serialization keeps the HW complexity low and die area efficient. This scheme also helps to reduce the corner cases that can happen in a more complicated design such as processing different types of requests in parallel.

FIGS. 4A–D further describe the handling of TLB requests as illustrated above in FIG. 3.

Figures 4A, 4B:
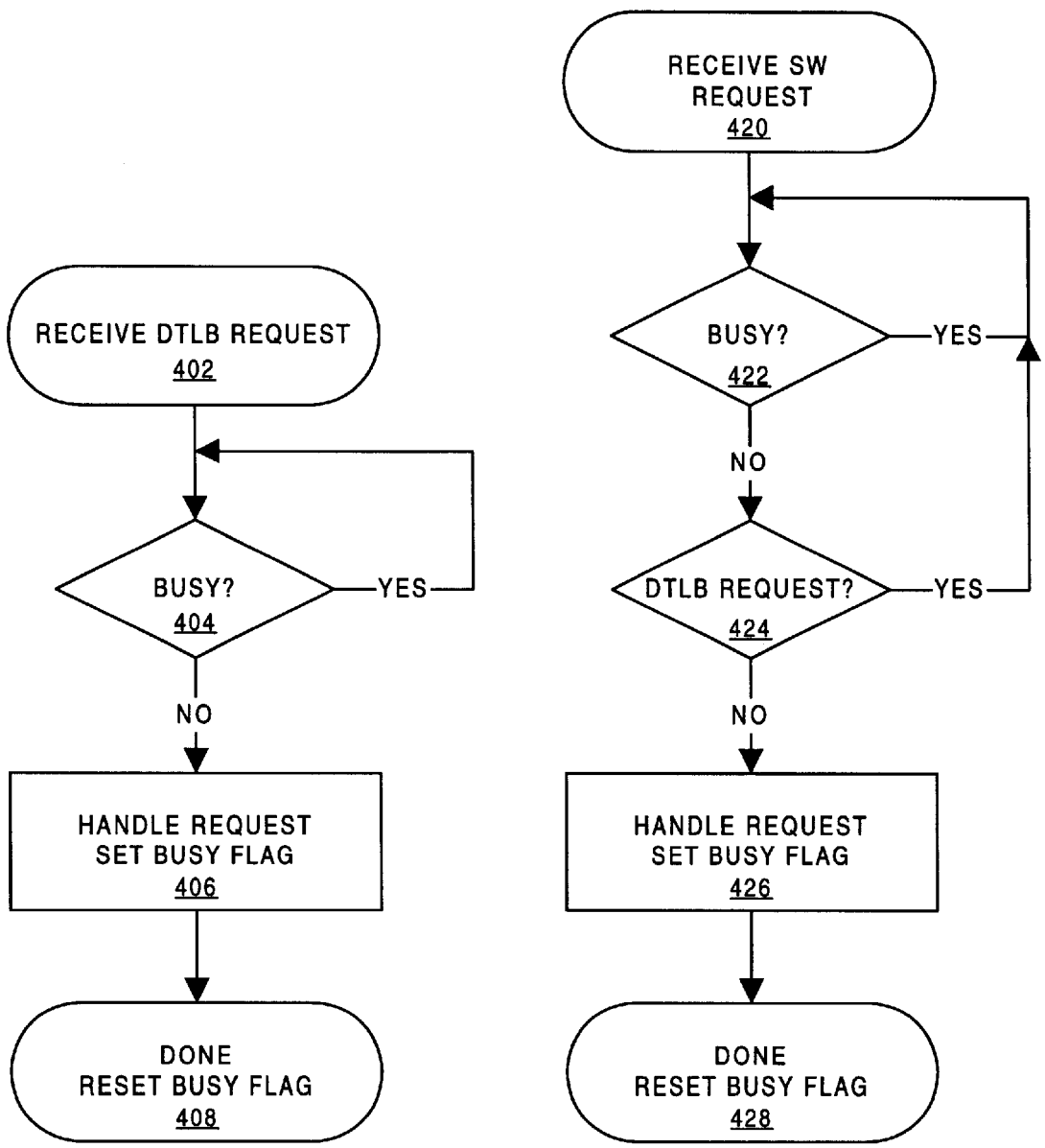
FIG. 4A illustrates the handling of data TLB hardware requests in one embodiment.
FIG. 4B illustrates the handling of software requests in one embodiment.

FIG. 4A illustrates the handling of data TLB hardware requests in one embodiment. At step 402, the HPW logic in the TLB receives a DTLB request for processing. The logic first determines whether the TLB is currently busy with a previous request in progress at step 404. If the TLB is busy, the logic waits and polls the TLB until the TLB is available. If the TLB is not busy, the logic proceeds to handle the DTLB request at step 406. The busy flag is also set so that other requests to the TLB would not be processed while this DTLB request is being completed. After the DTLB request is completed, the busy flag is reset at step 408.

FIG. 4B illustrates the handling of software requests in one embodiment. At step 420, the HPW logic in the TLB receives a software request for processing. The logic first determines whether the TLB is currently busy with a previous request in progress at step 422. If the TLB is busy, the logic waits and polls the TLB until the TLB is available. If the TLB is not busy, the logic proceeds to determine if a DTLB request is also queued for the same time at step 424. If there is a DTLB request queued for that clock cycle, then the software request stalls and polls the TLB at step 422. If there is no DTLB request pending for the same clock period, then the logic proceeds to handle the software request at step 426. The busy flag is also set so that other requests to the TLB would not be processed while this software request is being completed. After the software request is completed the busy flag is reset at step 428.

FIG. 4C illustrates the handling of TLB shootdown requests in one embodiment. At step 440, the HPW logic in the TLB receives a TLB shootdown request for processing. The logic first determines whether the TLB is currently busy with a previous request in progress at step 442. If the TLB is busy, the logic waits and polls the TLB until the TLB is available. If the TLB is not busy, the logic proceeds to determine if a DTLB request is also queued for the same time at step 444. If there is a DTLB request queued for that clock cycle, then the TLB shootdown request stalls and polls the TLB at step 442. The logic then proceeds to determine if a software request is also queued for the same time at step 446. If there is a software request queued for that clock cycle, then the TLB shootdown request stalls and polls the TLB at step 442. If there is no DTLB or software requests pending for the same clock period, then the logic proceeds to handle the TLB shootdown request at step 448. The busy flag is also set so that other requests to the TLB would not be processed while this TLB shootdown request is being completed. After the software request is completed the busy flag is reset at step 450.

FIG. 4D illustrates the handling of instruction TLB hardware requests in embodiment. At step 460, the HPW logic in the TLB receives an ITLB hardware request for processing. The logic first determines whether the TLB is currently busy with a previous request in progress at step 462. If the TLB is busy, the logic waits and polls the TLB until the TLB is available. If the TLB is not busy, the logic proceeds to determine if a DTLB request is also queued for the same time at step 464. If there is a DTLB request queued for that clock cycle, then the ITLB hardware request stalls and polls the TLB at step 462. The logic then proceeds to determine if a software request is also queued for the same time at step 466. If there is a software request queued for that clock cycle, then the ITLB hardware request stalls and polls the TLB at step 462. The logic also determines if a TLB shootdown request is queued for the same time at step 468. If there is a TLB shootdown request queued for that clock cycle, then the ITLB hardware request stalls and polls the TLB at step 462. If there is no DTLB, software, or TLB shootdown requests pending for the same clock period, then the logic proceeds to handle the ITLB hardware request at step 470. The busy flag is also set so that other requests to the TLB would not be processed while this ITLB hardware request is being completed. After the software request is completed the busy flag is reset at step 472.

In the foregoing specification, the invention has been described with reference to specific exemplary embodiments thereof. It will, however, be evident that various modifications and changes may be made thereof without departing from the broader spirit and scope of the invention as set forth in the appended claims. The specification and drawings are, accordingly, to be regarded in an illustrative rather than a restrictive sense.

What is claimed is:

1. A method comprising:
   prioritizing a first translation lookaside buffer request and a second translation lookaside buffer request for handling, said first request of a first type and said second request of a second type, said first type having a higher priority than said second type; and
   wherein said first type and said second type are each either a data translation lookaside buffer hardware purge/insert, a software purge/insert, an instruction translation lookaside buffer purge/insert, or a translation lookaside shootdown purge.

2. The method of claim 1 further comprising receiving said first request and said second request for handling during a same execution cycle.

3. The method of claim 1 further comprising handling said first request having a higher priority prior to handling said second request.

4. The method of claim 3 further comprising setting a busy flag when said first request is being handled.

5. The method of claim 4 further comprising clearing said busy flag when said first request is completed.

6. The method of claim 1 further comprising stalling said second request if a higher priority request is queued for a same execution cycle.

7. The method of claim 1 further comprising handling said first and second requests in a priority order of data translation lookaside buffer hardware purge/insert type first, software purge/insert type second, instruction translation lookaside buffer purge/insert type third, and translation lookaside shootdown purge type fourth.

8. The method of claim 1 wherein priority of a request is based on where said request originates from and type of said request.

9. An apparatus comprising:
   a hardware page walker to prioritize a first translation lookaside buffer request and a second translation lookaside buffer request, said first request of a first type and said second request of a second type, said first type having a higher priority than said second type; and
   wherein said first type and said second type is each either a data translation lookaside buffer hardware purge/insert, a software purge/insert, an instruction translation lookaside buffer purge/insert, or a translation lookaside shootdown purge.

10. The apparatus of claim 9 further comprising a translation lookaside buffer to receive said first request and said second request for handling during a same execution cycle.

11. The apparatus of claim 10 wherein said first and second requests are requests to modify an entry in said translation lookaside buffer.

12. The apparatus of claim 9 wherein said first request is from a data translation lookaside buffer hardware.

13. The apparatus of claim 9 wherein said second request is from software.

14. The apparatus of claim 9 wherein said second request is from an external processor.

15. The apparatus of claim 9 wherein said second request is from an instruction translation lookaside buffer hardware.

16. The apparatus of claim 9 wherein priority of a request is based on where said request originates from and type of said request.

17. The apparatus of claim 9 wherein said hardware page walker is to handle translation lookaside buffer requests in a priority order of data translation lookaside buffer hardware purge/insert types first, software purge/insert types second, instruction translation lookaside buffer purge/insert types third, and translation lookside shootdown purge types fourth.

18. An integrated circuit device comprising:
   a translation lookaside buffer to receive a first translation lookaside buffer request and a second translation lookaside buffer request for handling, said first request of a first type and said second request of a second type, said first type having a higher priority than said second type;
   wherein each of said first type and said second type is a data translation lookaside buffer hardware purge/insert, a software purge/insert, an instruction translation lookaside buffer purge/insert, or a translation lookaside shootdown purge; and
   a hardware page walker coupled to said translation lookaside buffer, said hardware page walker to prioritize said first request and said second requests.

19. The integrated circuit device of claim 18 further comprising a instruction prefetch unit coupled to said translation lookaside buffer, said instruction prefetch unit to access and modify an entry in said translation lookaside buffer.

20. The integrated circuit device of claim 18 wherein said integrated circuit device is a microprocessor.

21. The integrated circuit device of claim 18 wherein said first and second requests are requests to modify an entry in said translation lookaside buffer.

22. The integrated circuit device of claim 21 wherein said first and second requests are received simultaneously at said hardware page walker to be handled during a same execution cycle.

23. The integrated circuit device of claim 18 wherein said first and second requests originate from different sources in said integrated circuit device.

24. The integrated circuit device of claim 18 wherein said hardware page walker is to handle translation lookaside buffer requests in a priority order of data translation lookaside buffer hardware purge/insert types first, software purge/ insert types second, instruction translation lookaside buffer purge/insert types third, and translation lookaside shootdown purge types fourth.

25. The integrated circuit device of claim 24 wherein said hardware page walker takes into account where each translation lookaside buffer request originates from when prioritizing said first and second requests.

26. A system comprising:
a bus;
a first processor coupled to said bus, said first processor further comprising:
   a first execution unit; and
   a first translation lookaside buffer; and
a second processor coupled to said bus, said second processor further comprising:
   a second execution unit;
   a second translation lookaside buffer, and
   a hardware page walker coupled to said second translation lookaside buffer, said hardware page walker to prioritize a first translation lookaside buffer access request and a second translation lookaside buffer access request, wherein each of said translation lookaside buffer access request is a data translation lookaside buffer hardware purge/insert type, a software purge/insert type, an instruction translation lookaside buffer purge/insert type, or a translation lookaside shootdown purge type.

27. The system of claim 26 wherein said first request is of a first type and said second request is of a second type, said first type having a higher priority than said second type, wherein priority of a request is based on where said request originates from and type of said request.

28. The system of claim 26 wherein said first and second requests are requests to modify an entry in said second translation lookaside buffer.

29. The system of claim 26 wherein said first request originates from within said second processor.

30. The system of claim 26 wherein said second request originates from said first translation lookaside buffer.

31. The system of claim 26 wherein said hardware page walker stalls said second request if a higher priority request is queued for a same execution cycle.

32. The system of claim 26 wherein said first request originates from hardware.

33. The system of claim 26 wherein said second request originates from software.

34. The system of claim 26 wherein said hardware page walker is to handle translation lookaside buffer requests in a priority order of data translation lookaside buffer hardware purge/insert types first, software purge/insert types second, instruction translation lookaside buffer purge/insert types third, and translation lookaside shootdown purge types fourth.

35. The system of claim 34 wherein said hardware page walker takes into account origins for each of said first and second translation lookaside buffer requests in prioritizing said first and second translation lookaside buffer requests.

* * * * *

UNITED STATES PATENT AND TRADEMARK OFFICE
CERTIFICATE OF CORRECTION

PATENT NO. : 6,728,800 B1
DATED : April 27, 2004
INVENTOR(S) : Lee et al.

It is certified that error appears in the above-identified patent and that said Letters Patent is hereby corrected as shown below:

Column 8,
Line 31, delete "lookside" and insert -- lookaside --.

Signed and Sealed this

Sixth Day of July, 2004

JON W. DUDAS
*Acting Director of the United States Patent and Trademark Office*